US006169518B1

(12) United States Patent
Nelson et al.

(10) Patent No.: US 6,169,518 B1
(45) Date of Patent: Jan. 2, 2001

(54) DUAL BEAM MONOPULSE ANTENNA SYSTEM (75) Inventors: Everett A. Nelson, Largo; Edward A. Flick, Seminole, both of FL (US)

(73) Assignee: Raytheon Company, Lexington, MA (US)

( * ) Notice: Under 35 U.S.C. 154(b), the term of this patent shall be extended for 0 days.

(21) Appl. No.: 06/158,817

(22) Filed: Jun. 12, 1980

(51) Int. Cl.[7] .............................. H01Q 3/22; H01Q 3/24; H01Q 3/26
(52) U.S. Cl. ........................... 342/373; 342/149; 343/768
(58) Field of Search .......................... 343/100 SA, 854, 343/895, 777, 778, 768, 16 M, 16 LS; 342/373, 149

(56) References Cited

U.S. PATENT DOCUMENTS 3,824,500 * 7/1974 Rothenberg .................... 343/100 SA
4,041,501 * 8/1977 Frazita et al. .................. 343/100 SA
4,176,359 * 11/1979 Fassett et al. ....................... 343/854

* cited by examiner

Primary Examiner—Theodore M. Blum
(74) Attorney, Agent, or Firm—Baker Botts L.L.P.

(57) ABSTRACT

A dual beam monopulse antenna system includes a flat plate antenna (10). The antenna (10) comprises a plurality of slotted waveguides (20) which transmit radiation through slots (28). The antenna is divided into quadrants (12, 14, 16, 18) for monopulse operation. Each of the quadrants is provided with primary and secondary feed lines which are connected through directional couplers (42–136) to connecting lines (146–192) to the slotted waveguides (20). The primary feed lines (26, 28, 30, 32) are connected to a primary monopulse comparator network and the secondary feed lines (34, 36, 38, 40) are connected to a secondary monopulse comparator network. The summation terminals of the monopulse comparator networks are connected to a switch network (322). The azimuth differential terminals of the monopulse comparator networks are connected to a switch network (332). The elevation differential terminals of the monopulse comparator networks are connected to a switch network (342). The switch networks are set to a first state to generate a pencil beam in which the slotted waveguides (20) are connected to the system summation terminal (330), system azimuth terminal (340) and system elevation terminal (350). In a second state the switch networks are set such that the slotted waveguides (20) are connected to both the primary and secondary feed assemblies and therefore to the primary and secondary monopulse comparator networks. In the second state the slotted waveguides (20) produce a shaped search beam which has a greater vertical dimension than horizontal dimension. The antenna system, however, operates in the monopulse mode with both antenna beams. The system can be rapidly switched from one beam shape to the other. Polarization discs (458, 460) are positioned parallel to and spaced apart from antenna (10) to select a polarization desired for the beam produced by the antenna system by rotation of the polarization disc (458, 460).

19 Claims, 6 Drawing Sheets

DUAL BEAM MONOPULSE ANTENNA SYSTEM

TECHNICAL FIELD

The present invention pertains to the field of radar and in particular to an antenna system for monopulse operation.

BACKGROUND ART

Heretofore monopulse radar systems have been limited to monopulse direction finding in directions orthogonal to a plane which is symmetrical with and essentially perpendicular to the axis of the radar beam. The signals received through the separate elements are compared in phase and amplitude to determine the angle of the return relative to the boresight of the antenna. Since a uniform, symmetrical beam pattern is best for a monopulse operation in the receive mode, the transmitted beam is limited to the same configuration due to reciprocity. As such, a monopulse system is more appropriate for use in a tracking function rather than in a search function. The adaptation of a monopulse system for searching requires the use of complex and expensive techniques such as raster scanning.

In view of the above limitations inherent in existing monopulse radar systems, there exists a need for a monopulse radar system which can generate a search type beam in addition to a conventional pencil beam while maintaining monopulse operation in the receive mode for both the search and pencil beams.

DISCLOSURE OF THE INVENTION

A dual beam monopulse antenna system is described which produces both a pencil beam and a shaped search beam. The antenna includes an array of slotted waveguides arranged in a plurality of groups to form a flat plate antenna. A primary feed assembly is provided for each of the groups of the slotted waveguides with the primary feed assembly coupled to the slotted waveguides in the corresponding group. A secondary feed assembly is provided for each group of the slotted waveguides and the secondary feed assembly is coupled to both the slotted waveguides and the primary feed assembly for the corresponding group. A primary monopulse network is connected to the primary feed assemblies and has a summation terminal, a first difference terminal and a second difference terminal. A secondary monopulse network is connected to the secondary feed assemblies and has a summation terminal, a first difference terminal and a second difference terminal. A first switching and summation circuit is provided for coupling a system summation terminal to either the primary monopulse network terminal or to both the primary and the secondary monopulse network summation terminals. A second switching and summation circuit is provided for coupling a system first difference terminal to either the primary monopulse network first difference terminal or to both the primary and the secondary monopulse network first difference terminals. A third switching and summation circuit is provided for coupling a system second difference terminal to either the primary monopulse network second difference terminal or to both the primary and the secondary monopulse network second difference terminals. The switching circuits are set to a first state in which the antenna system produces a pencil beam or to a second state in which the system produces a shaped beam, while the antenna system operates in the monopulse mode for both beams.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

In the following description, like reference numerals refer to like elements throughout the various views.

Figure 1:
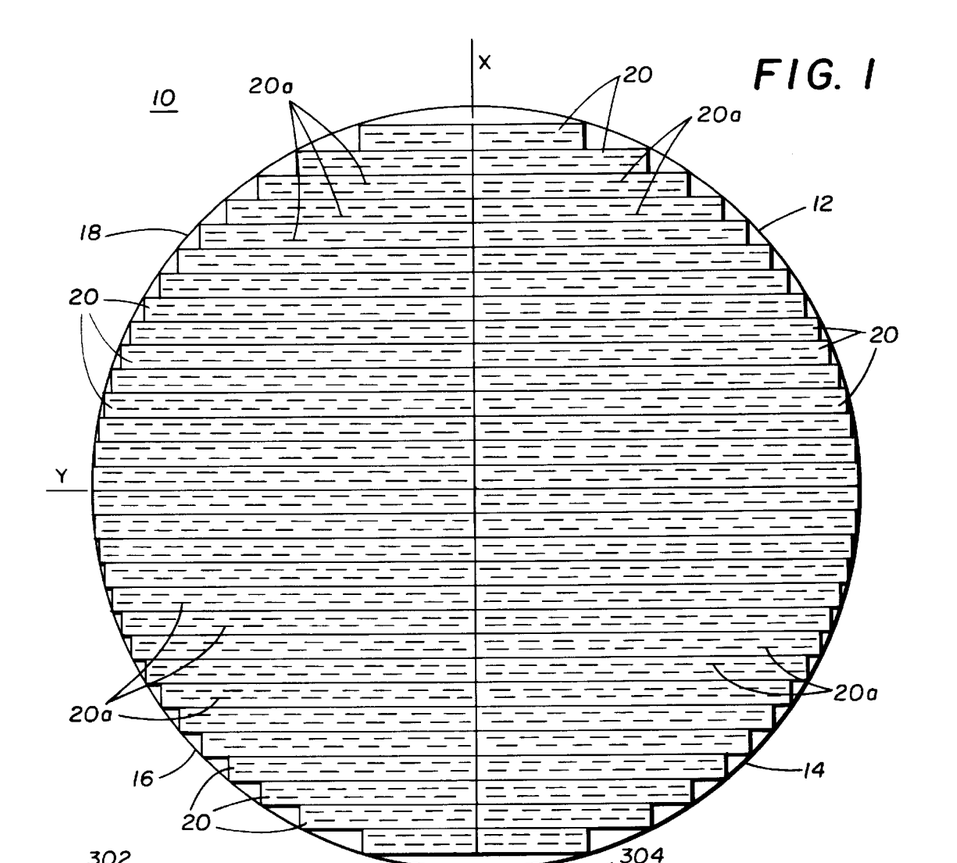
FIG. 1 is an elevation view of the front face of a flat plate slotted waveguide monopulse antenna for use in conjunction with the present invention.

Referring to FIG. 1, there is shown a frontal view of a flat plate antenna 10 which comprises four quadrants 12, 14, 16 and 18. The quadrants are divided along the X and Y axes of the antenna 10.

Figure 2:
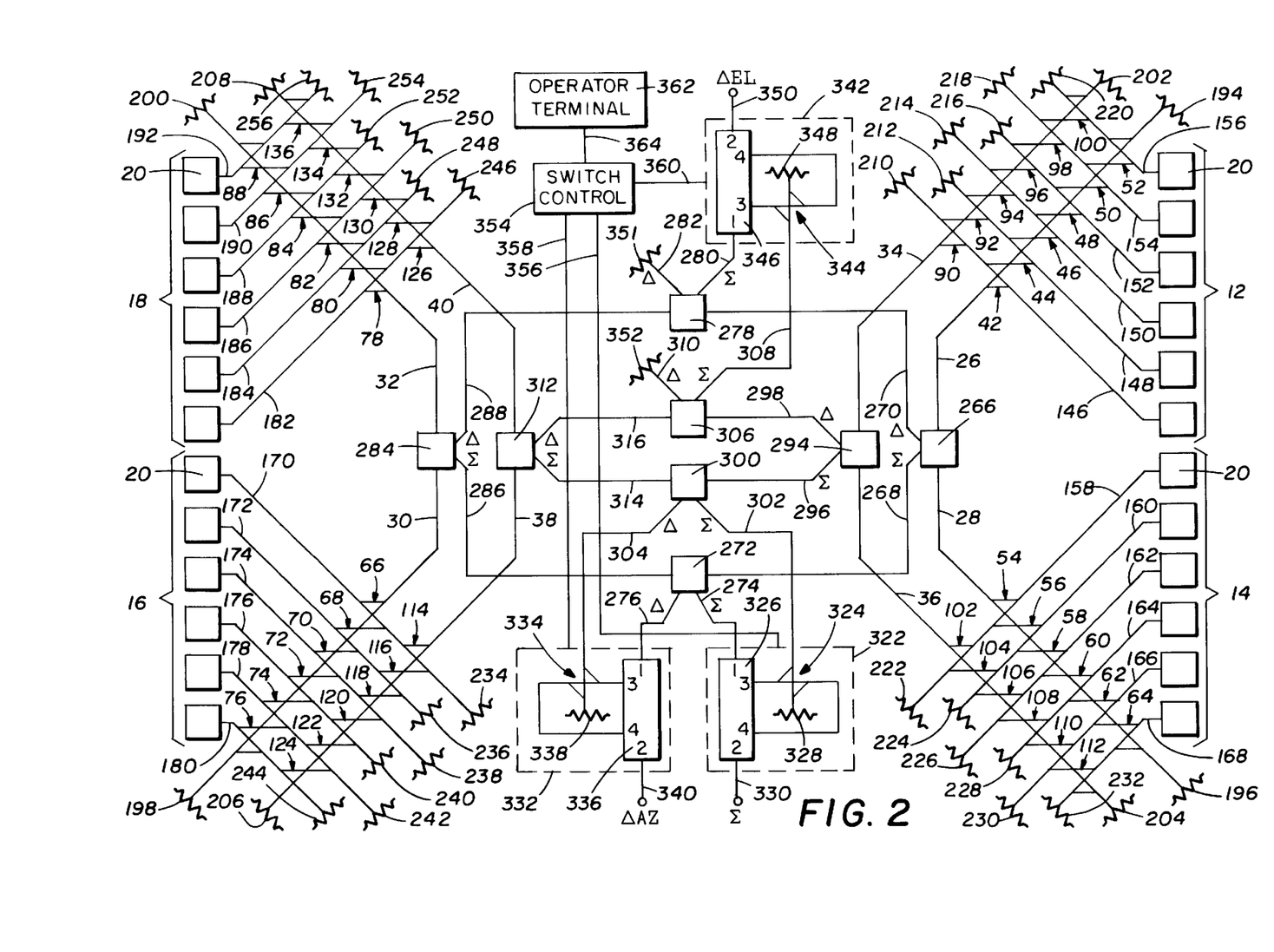
FIG. 2 is a schematic illustration of the feed network for the antenna shown in FIG. 1.

Each of the quadrants in the antenna 10 is made up of a stacked array of slotted waveguides 20. The waveguides 20 have greater length at the center of antenna 10 and have lesser length at the upper and lower extremities of the antenna. Each of the waveguides 20 has a pattern of slots 20a cut into the waveguide to permit radiation of microwave energy from the waveguide. Slots 20a can be cut in the waveguides 20 in a wide range of configurations commonly known in the art. In a preferred embodiment the slots 20a are cut in an alternating longitudinal pattern along the waveguides 20. The antenna 10, in a preferred embodiment, has a diameter of approximately 18 inches. Such a preferred embodiment has been designed to operate at $K_a$ band. The feed network for antenna 10 is illustrated in FIG. 2. For ease of illustration, the antenna 10 has been separated into the quadrants 12, 14, 16 and 18 and the waveguides 20 oriented perpendicular to the plane of the drawing. Each of the quadrants of antenna 10 is provided with a primary and a secondary feed line. Primary feed lines 26, 28, 30 and 32 are provided respectively for quadrants 12, 14, 16 and 18. Only a limited number of the waveguides 20 are shown in FIG. 2, it being understood that the additional waveguides are connected in a similar configuration to those shown. Secondary feed lines 34, 36, 38 and 40 are provided respectively for the quadrants 12, 14, 16 and 18.

Each of the primary and secondary feed lines in each quadrant is connected to a plurality of directional couplers. Primary feed line 26 is connected to directional couplers 42–52. Feed line 28 is connected to directional couplers 54–64. Primary feed line 30 is connected to directional couplers 66–76. Primary feed line 32 is likewise connected to directional couplers 78–88.

The secondary feed lines are provided with directional couplers in the same manner as the primary feed lines. In particular, feed line 34 is connected to directional couplers 90–100, secondary feed line 36 is connected to directional couplers 102–112, feed line 38 is connected to couplers 114–124 and secondary feed line 40 is connected to directional couplers 126–136.

The directional couplers 42–136 are drawn to show the direction of signal transfer through the coupler. The horizontal lines within each coupler show the path through which a portion of the energy within the connected waveguide is transferred to the transversely connected waveguide.

Each of the slotted waveguides 20 is joined through a connecting line to a directional coupler connected to a primary feed line and to a directional coupler connected to a secondary feed line. Within quadrant 12 the slotted waveguides 20 are joined to connecting lines 146–156 which are connected respectively to directional couplers 42–52 and 90–100. In quadrant 14 the slotted waveguides 20 are joined to connecting lines 158–168 which are connected respectively to directional couplers 54–64 and 102–112. In quadrant 16 the slotted waveguides 20 are joined to connecting lines 170–180 which are, in turn, connected respectively to directional couplers 66–76 and 114–124.

The final quadrant 18 has the slotted waveguides 20 joined to connecting lines 182–192 which are connected respectively to the directional couplers 78–88 and 126–136.

Although the primary and secondary feed lines, as well as connecting lines, are shown in FIG. 2 as single conductor lines, they are preferably fabricated as waveguides.

The free ends of the primary feed lines, secondary feed lines and connecting lines are fitted with terminations to provide proper impedance matching for the circuit. The feed lines 26–40 are fitted with terminations 194–208. The connecting lines 146–192 are fitted with terminations 210–256. Each of the slotted waveguides 20 is also equipped with a termination (not shown).

The primary feed line 26, together with the directional couplers 42–52 and connecting lines 146–156, comprise a primary feed assembly for quadrant 12. Each of the remaining quadrants 14–18 has a similar primary feed assembly.

The secondary feed line 34, together with the directional couplers 90–100, comprise a secondary feed assembly for quadrant 12. Each of the remaining quadrants 14–18 has a similar secondary feed assembly.

The primary feed lines 26 and 28 are connected to a 180° hybrid 266 which has a summation line 268 and a difference line 270. The signal produced on line 268 represents the summation of the signals received at the primary feed lines 26 and 28. The signal produced on line 270 represents the difference of the signals received on the primary feed lines 26 and 28. Line 268 is connected to a 180° hybrid 272 which has a summation line 274 and a difference line 276. The difference line 270 is connected to a 180° hybrid 278 which has a summation line 280 and a difference line 282.

The primary feed lines 32 and 30 are connected to a 180° hybrid 284 having a summation line 286 and a difference line 288. The summation line 286 is connected to the hybrid 272 and the difference line 288 is connected to the hybrid 278.

The hybrids 266, 272, 278 and 284 make up a primary monopulse comparator network which receives signals from the quadrants 12, 14, 16 and 18 of antenna 10 to produce a summation of the signals on summation line 274, an azimuth differential signal on difference line 276 and an elevation differential signal on difference line 280.

The secondary feed lines 34–40 are likewise connected to a secondary monopulse comparator network. Lines 34 and 36 are connected to a 180° hybrid 294 which has a summation line 296 and a difference line 298. Summation line 296 is connected to a 180° hybrid 300 which has a summation line 302 and a difference line 304. The difference line 298 is connected to a 180° hybrid 306 which has a summation line 308 and a difference line 310. The secondary feed lines 38 and 40 are likewise connected to a 180° hybrid 312 having a summation line 314 and a difference line 316. Summation line 314 is connected to the hybrid 300 while difference line 316 is connected to the hybrid 306. The secondary monopulse comparator network comprises the hybrids 294, 300, 306 and 318.

The summation lines 274 and 302 are connected to a switch network 322 which comprises a directional coupler 324 and a switchable four port circulator 326. Line 302 is connected to directional coupler 324 while line 274 is connected to the first port of circulator 326. The directional coupler 324 is further connected to the third and fourth ports of circulator 326. A fourth port of directional coupler 324 is provided with a termination 328. The second port of circulator 326 is connected to a system summation terminal 330.

The difference lines 276 and 304 are connected to a switch network 332 which includes a directional coupler 334 and a switchable four port circulator 336. Line 276 is connected to the first port of circulator 336 while line 304 is connected to the directional coupler 334 which is connected to termination 338 and is further connected to ports 3 and 4 of circulator 336. Port 2 of the circulator 336 is connected to a system azimuth difference terminal 340.

The summation lines 280 and 308 are connected to a switch network 342 which includes a directional coupler 344 and a four port circulator 346. Line 308 is connected to the directional coupler 344 which is provided with a termination 348. The summation line 280 is connected to port 1 of circulator 346 and the directional coupler 344 is connected to ports 3 and 4. Port 2 of circulator 346 is connected to a system elevation differential terminal 350.

Hybrids 278 and 306 have the differential lines 282 and 310 connected respectively to terminations 351 and 352.

The operation of switches 322, 332 and 342 is controlled by a switch control circuit 354 which transmits control signals through lines 356, 358 and 360 to the respective switch networks. The operation of the switches can be overridden by commands generated at an operator terminal 362 and transmitted through a control line 364.

Figure 3:
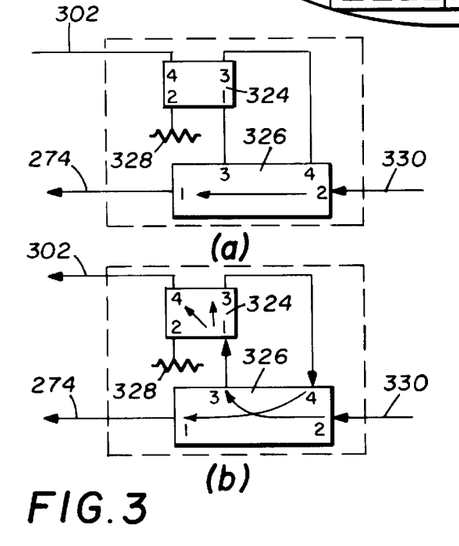
FIG. 3 is a schematic illustration of the operation of one of the switching and summation circuits of FIG. 2 when the antenna is transmitting.
Figure 4:
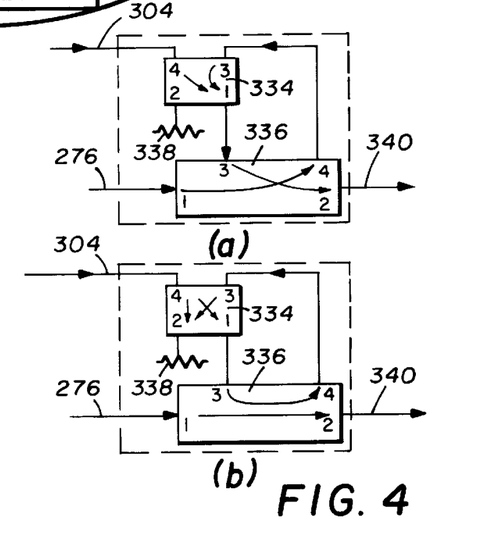
FIG. 4 is a schematic illustration of the operation of one of the switching and summation circuits of FIG. 2 when the antenna is receiving.

The operational states and signal flow through switches 322, 332 and 342 are shown in FIGS. 3 and 4.

Operation of the dual beam monopulse antenna system of the present invention is now described in reference to FIGS. 1–4. As noted above monopulse antenna systems have heretofore generated a unitary beam pattern having a pencil shape. This beam pattern has been utilized in both the transmit and receive modes. The limitation to a pencil beam severely restricts the use of a monopulse radar system for search operations which require the antenna beam to sweep through a large volume of space. The present invention provides an antenna system which includes both the antenna and the feed network to produce both a shaped search beam and a conventional pencil beam while at the same time operating in the monopulse mode with both beams.

The system summation terminal 330 is connected to external equipment including a transmit/receive switch (not shown) which alternately connects the terminal to a microwave transmitter and a receiver. The transmit mode of the present invention has two states, each corresponding to one of the beam patterns produced by the antenna. The first state is provided by selection of the switch 322 to operate in the manner shown in FIG. 3(a). In this state the RF energy produced by the transmitter is conveyed directly from port 2 of circulator 326 to port 1 and into line 274. The RF energy is then split by hybrid 272 and transmitted into lines 268 and 286 to hybrids 266 and 284 respectively. In hybrid 266 the RF energy is further split and transmitted into primary feed lines 26 and 28. Likewise the RF energy is split by hybrid 284 and conveyed into primary feed lines 30 and 32.

Each of the directional couplers connected to primary feed line 26 extracts a part of the RF energy and transmits it through the corresponding connecting line to the slotted waveguide 20 within quadrant 12. The connecting lines 146–156 are constructed to have such a length so that the transmission path from hybrid 266 to each of the waveguides 20 is the same length. This insures that the phase of the signals transmitted from the waveguides 20 is consistent to produce a pencil shaped beam.

The RF energy transmitted through the remaining primary feed lines 28, 30 and 32 is likewise conveyed through the directional couplers into the waveguides 20 within quadrants 14, 16 and 18. Within each of the slotted waveguides 20, the energy is emitted from the slots 20a to produce a pencil beam of radiated energy. Note that the secondary feed lines 34–40 are isolated when switch 322 is in state 1 so that no energy is transmitted through these feed lines. The directional couplers connected to the primary feed lines further isolate the secondary feed lines to prevent any interaction between the primary and secondary feed lines in this operating state.

The second transmitting state corresponds to the second state of switch 322 as shown in FIG. 3(b). In this case the RF energy from the transmitter is provided to port 2 of circulator 326 and is transmitted through the circulator to port 3 where it is transferred to port 1 of directional coupler 324. Within the directional coupler, the energy is split and provided to ports 3 and 4. The energy received at port 4 is transmitted through line 302 to the hybrid 300. The energy received at port 3 is returned to port 4 of circulator 326 where it is transmitted to port 1 and line 274 to hybrid 272. The energy transmitted through hybrid 272 is conveyed to each of the slotted waveguides 20 in the same manner as described above.

The RF energy transmitted through line 302 to hybrid 300 is split by the hybrid and transmitted to hybrids 294 and 312 where it is further split and provided to the secondary feed lines 34, 36, 38 and 40. The secondary feed lines transmit the RF energy to the respective couplers connected thereto where each coupler extracts a portion of the energy and transmits it to the corresponding connecting line to the slotted waveguides 20. For example, the secondary feed line 34 transmits energy to each of the hybrids 90–100 and each hybrid transfers a part of this energy through its respective connecting lines 146–156 to the waveguides 20. The degree of coupling of each of the couplers 90–100 is set so that the signals transmitted to the connecting lines combine with the signals from the primary feed lines to produce within the waveguides 20 signals having appropriate phase and amplitude for generating a shaped beam, preferably a beam having a greater vertical width than horizontal width and further preferably having a cosecant squared pattern. In general the coupling values become less from the coupler 90 outward toward the termination 202. The remaining secondary feed lines and corresponding couplers operate in the same fashion. Thus, when switch 322 is operating in state 2, the antenna system of the present invention produces a shaped search beam rather than a pencil beam.

A preferred set of coupling values for the directional couplers, such as 42–52, connected to the primary feed and the directional couplers, such as 90–100, connected to the secondary feed in each quadrant are listed below in Table 1. The directional couplers 42–52 and 90–100 in a preferred embodiment are cross guide couplers. These values are for a system having a greater number of slotted waveguides 20 than shown in FIG. 2. The coupling values are listed to correspond to the slotted waveguides 20 starting at the center and moving outward. These are coupling values for an antenna system operating in the $K_a$ frequency band.

TABLE 1

| PRIMARY FEED COUPLER VALUES (DB) | SECONDARY FEED COUPLER VALUES (DB) |
|---|---|
| 12.18 | 15.63 |
| 11.60 | 19.89 |
| 11.34 | 19.19 |
| 10.96 | 21.17 |
| 10.80 | 24.46 |
| 10.78 | 21.37 |
| 10.64 | 23.59 |
| 10.63 | 20.61 |
| 10.52 | 18.25 |
| 10.51 | 18.71 |
| 10.51 | 15.27 |
| 10.51 | 15.88 |
| 10.51 | 13.76 |
| 10.53 | 13.34 |
| 10.55 | 12.97 |
| 10.64 | 11.46 |
| 10.69 | 12.18 |
| 10.75 | 10.49 |
| 10.86 | 11.08 |
| 10.95 | 10.03 |
| 11.08 | 9.80 |
| 11.23 | 9.81 |
| 11.36 | 8.62 |
| 11.54 | 9.49 |
| 11.73 | 7.54 |
| 11.93 | 8.12 |
| 12.15 | 6.38 |
| 12.38 | 4.28 |

When the shaped beam is produced by the circuit of the present invention, the antenna 10 is mechanically rotated to cause the beam to scan through a volume of space.

Thus, the circuit shown in FIG. 2 produces a pencil shaped beam when switch 322 is set in the state shown in FIG. 3a and the circuit produces a shaped search beam when the switch 322 is in the state shown in FIG. 3(b). The pencil beam is produced when the RF energy is provided only to the primary feed lines and the shaped search beam is produced when RF energy is provided to both the primary and secondary feed lines.

The receive mode of operation of the present invention is described in reference to FIGS. 2 and 4. In the receive mode each of the slotted waveguides 20 receives a signal through the slots 20a and transmits the signal through the connecting lines 146–192 to both the primary and secondary feed lines 26–40. The signals transmitted through primary feed lines 26 and 30 are provided to hybrid 266 which produces a sum of the signals on line 268 and a difference of the signals on line 270. A similar operation occurs with primary feed lines 30 and 32 which feed the signal to hybrid 284. The summation signals produced by hybrids 266 and 284 are transmitted to hybrid 272 which, in turn, produces a summation of these summation signals as well as a difference of these two summation signals.

The difference signals produced by hybrids 266 and 284 are transmitted to hybrid 278 which also produces a summation signal of the two difference signals and a difference signal of the two difference signals. The difference signal is transmitted through line 282 to the termination 351. The summation signal is transmitted through line 280 to switch 342. The combination of the hybrids 266, 272, 278 and 284 function as the primary monopulse comparator network which receives the signals from quadrants 12–18 and produces a summation signal on line 274, an azimuth difference signal on line 276 and an elevation difference signal on line 280. The hybrids 294, 300, 306 and 312 function in conjunction with the secondary feed lines 34–40 as the secondary monopulse comparator network which produces a summation signal on line 302, an azimuth difference signal on line 304 and an elevation difference signal on line 308.

When switches 332 and 342 are in state 1, as shown in FIG. 4(a), the energy received from both the primary and secondary feed lines are combined in the couplers 334 and 344 to produce a signal which is the combination of signals from both the primary and secondary feed lines. This occurs simultaneously in switches 322, 332 and 342. The three resulting product signals produced by the switches, when in state 1, are thus the result of signals received through both the primary and secondary feed lines. When signals are received from both of the feed lines, the antenna pattern is the shaped search beam as described above. Thus in state 1, the circuit shown in FIG. 2 operates in a monopulse mode while using a shaped search beam.

In the second receive mode of operation the switches 322, 332 and 342 are set in the position shown in FIG. 4(b). In this state the energy received from the secondary feed lines through lines 302, 304 and 308 is routed through the corresponding couplers and circulators such that the signals are transmitted respectively to terminations 328, 338 and 348. The signals from the primary feed lines are received through lines 274, 276 and 280. These are transferred to the respective system terminals 330, 340 and 350. In this operating state the antenna 10 effectively has a pencil shaped beam as described above. This is the conventional mode of operation for a monopulse radar system.

The preferred operating sequence of the antenna system of the present invention is as follows. The switch control 354 includes a timing mechanism which commutates switch 322 between shaped search beam transmit position, state 2 shown in FIG. 3(b), and shaped search beam receive position, state 1 shown in FIG. 4(a), for each transmit pulse. In addition, switches 332 and 342 are set for shaped search beam state 1 shown in FIG. 4(a). In this operating condition, the system produces a shaped search beam and the antenna 10 is mechanically rotated to scan the area of interest. With switch 322 commutating and switches 332 and 342 set as described above, a search beam is transmitted and the receive operation is carried out in monopulse fashion. When a target is detected, the operator manually positions the antenna in azimuth until azimuth acquisition (and range acquisition) occurs and azimuth tracking begins. The antenna is then supplying an error signal which permits the radar system to automatically slew the antenna in elevation, while maintaining azimuth track, until the target is in the tracking window of the elevation pencil beam. At this time switch control 354 reverses the commutating sequence of switch 322 and changes the states of switches 332 and 342 such that a pencil beam is produced in both transmit and receive modes. This concentrates the energy in a narrower pattern to enhance the detection and tracking of the target.

An operator is conventionally monitoring the return of the radar system on a display such as a CRT (not shown). The operator retains the option to select either the search or pencil beams by inputting commands through the operator terminal 362 which controls the switch control 354 through line 364. In this way the system is controlled manually.

When a target is detected, the operator typically designates the target by positioning the shaped beam in azimuth to point at the target. Normal monopulse acquisition involves first isolating the target in range, then processing the azimuth monopulse channel signal in this range cell to acquire the target in azimuth and finally repeating this process in elevation to complete the acquisition sequence.

A key feature of the present invention is the ability to provide an elevation error signal which is used to position the toe of the search beam pattern on the target such that when the beam is switched to pencil, the target signal will not be lost. Special design attention has been given to assure that the boresight of the pencil beam falls within 1 ½° of the toe of the search beam in elevation when switches 322, 332 and 342 are operated. With this capability, the acquisition process can transition automatically from detection and designation by the operator to a full three dimensional automatic tracking mode without loss of target and without need for further operator attention. The error signal in the search pattern can be used for target tracking. However, the accuracy of this capability will not attain the accurate track provided by the pencil beam output.

Figures 5, 6, 8, 9:
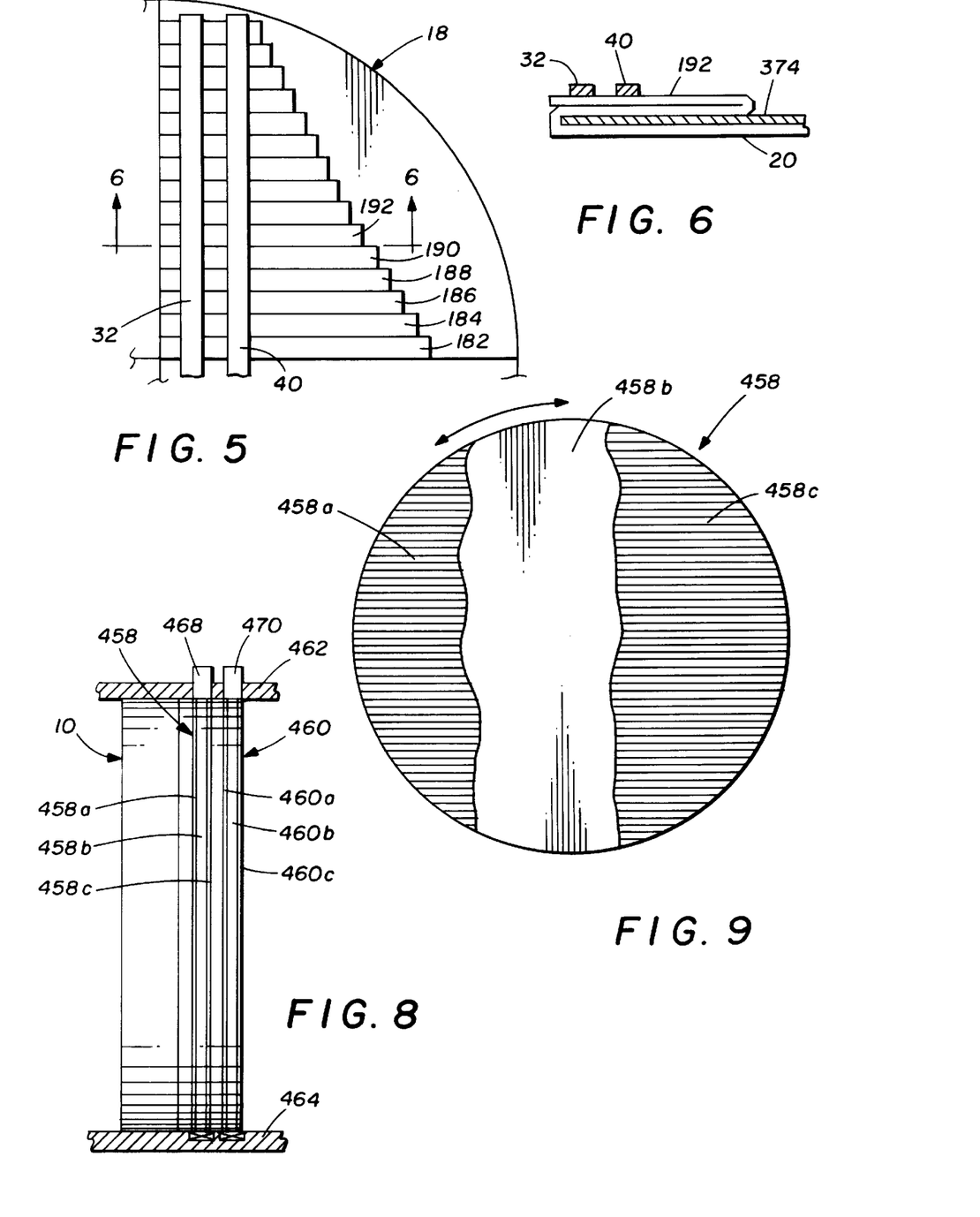
FIG. 5 is an elevation view of a quadrant of the feed network used with the antenna shown in FIG. 1.
FIG. 6 is a sectional view of the feed network shown in FIG. 5.
FIG. 8 is an elevation view of an antenna system including the antenna illustrated in FIG. 1 and a pair of rotatable polarization discs.
FIG. 9 is a cutaway, elevation view of the polarization disc shown in FIG. 8.

A detailed physical embodiment of the feed network for the system illustrated in FIG. 2 is shown in FIG. 5. The illustration in FIG. 5 represents a rear view of quadrant 18 of antenna 10. The primary and secondary feed lines 32 and 40 extend vertically over the connecting lines 182–192. Note that only a portion of the feed lines for the entire system are illustrated in FIG. 2. Both the feed lines and connecting lines comprise waveguides fabricated to convey the particular frequency used in the radar system. The waveguide connecting lines 32 and 40 are joined to the connecting lines in such a fashion to form the directional couplers 78–88 and 126–136. These directional couplers are described in further detail below. The feed shown in FIG. 5 is commonly termed a ladder network. The remaining three quadrants of the antenna 10 are provided with a similar structure to the one shown for quadrant 18.

A cross sectional view of the ladder network shown in FIG. 5 is illustrated in FIG. 6. Note that the connecting line, such as 192, is a folded waveguide which feeds the slotted waveguide 20. The connecting line is separated from the slotted waveguide 20 by a supporting structure 374.

Figure 7:
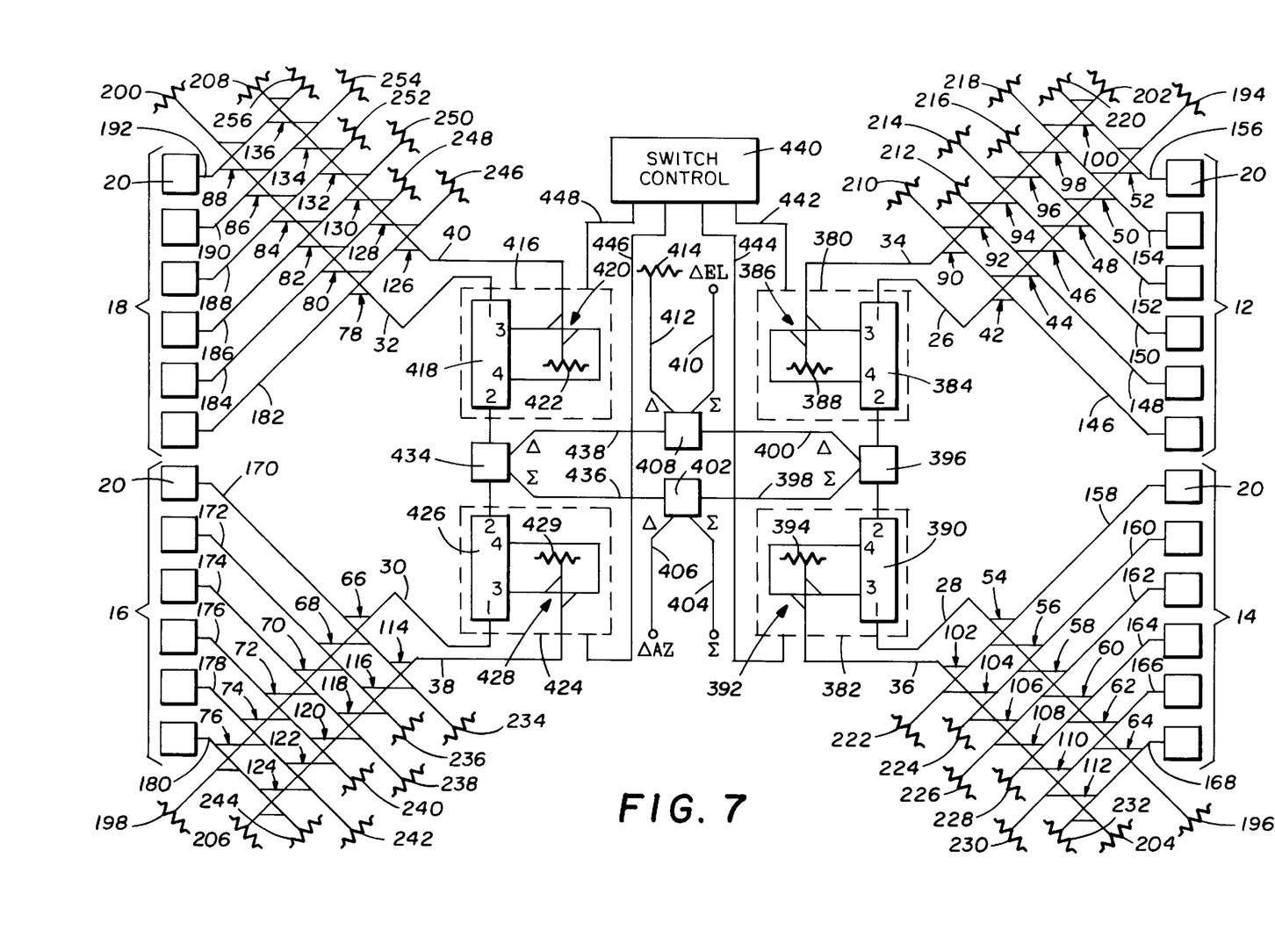
FIG. 7 is a schematic illustration of an alternative feed network in accordance with the present invention.

An alternative embodiment of the feed network of the present invention is illustrated in FIG. 7. The slotted waveguides, connecting lines, feed lines, couplers, terminations and system terminals are the same as shown in FIG. 2.

Primary feed line 26 and secondary feed line 34 are connected to a switch network 380. Primary feed line 28 and secondary feed line 36 are connected to a switch network 382. Switch network 380 includes a switchable four port circulator 384 and a directional coupler 386. Primary feed line 26 is connected to port 1 of circulator 384. Secondary feed line 34 is connected to the coupler 386 and is provided with a termination 388. The coupler 386 is further connected to ports 3 and 4 of circulator 384.

Primary feed line 28 is connected to port 1 of a circulator 390 and secondary feed line 36 is connected to a coupler 392. Line 36 is provided with a termination 394 following coupler 392. The coupler 392 is further connected to ports 3 and 4 of circulator 390.

Port 2 of circulators 384 and 390 are each connected to a 180° hybrid 396 which produces a summation of the input signals on a line 398 and a different signal on line 400. The summation line 398 is connected to a 180° hybrid 402 which has a summation line 404 and a difference line 406. Difference line 400 is connected to a 180° hybrid 408 which has a sum line 410 and a difference line 412. The difference line 412 is connected to a termination 414.

The primary feed line 32 and the secondary feed line 40 are connected to a switch network 416 which includes a switchable four port circulator 418 and a directional coupler 420. Primary feed line 32 is connected to port 1 of circulator 418 while secondary feed line 40 is connected to the coupler 420 and is provided with a termination 422. The coupler 420 is further connected to ports 3 and 4 of circulator 418.

Feed lines 30 and 38 are connected to a switch network 424 which includes a circulator 426 and a coupler 428. Primary feed line 30 is connected to port 1 of circulator 36 and secondary feed line 38 is connected to the coupler 428 and is provided with a termination 429. The remaining terminals of coupler 428 are connected to ports 3 and 4 of circulator 426.

Port 2 of circulators 418 and 426 are each connected to a 180° hybrid 434 which has a summation line 436 and a difference line 438. The summation line 436 is connected to hybrid 402 and the difference line 438 is connected to hybrid 408.

The operation of switch networks 380, 392, 416 and 424 is controlled by a switch control circuit 440 through lines 442, 444, 448 and 446 respectively.

The summation line 410 in FIG. 7 corresponds to the system elevation differential terminal 350 in FIG. 2. The summation line 406 in FIG. 7 corresponds to the system azimuth differential signal terminal 340 in FIG. 2 and the summation line 404 in FIG. 7 corresponds to the system summation signal terminal 330 in FIG. 2.

The alternative configuration of antenna feed shown in FIG. 7 uses one monopulse comparator but requires one additional switch network as compared to the feed network shown in FIG. 2. This circuit likewise produces a shaped beam and a pencil beam by selection of the states of switch networks 380, 382, 416 and 424. A pencil beam is generated by connecting only the primary feed lines 26, 28, 30 and 32 to the slotted waveguides 20 and a shaped search beam is produced by connecting both the primary feed lines and the secondary feed lines 34, 36, 38 and 40 to the slotted waveguides 20. Each of the switch networks 380, 382, 416 and 424 operates as shown for switch networks 322 and 332 shown in FIGS. 3 and 4 to generate the pencil and shaped beams in the states described above.

The antenna feed shown in FIG. 7 is somewhat less restrictive of the shaped beam illumination function, the signal drive on the connecting lines, as compared to the feed network shown in FIG. 2. However, implementation of the circuits shown in FIG. 7 is more difficult because the switches tend to introduce phase and amplitude errors that degrade the monopulse performance.

The antenna system of the present invention can further be provided with selectable polarization by use of the apparatus shown in FIGS. 8 and 9. Referring to FIG. 8, the antenna 10 is shown in a side elevation view where the beam generated by the antenna is directed through a first polarization disc 458 and a second polarization disc 460. Disc 458 is further shown in a cut-away illustration in FIG. 9. Disc 458 includes a first array of parallel wires 458a, a dielectric support 458b and a second array of parallel wires 458c. The polarization disc 60 likewise comprises a first array of parallel wires 460a, a dielectric support 460b and a second array of parallel wires 460c. Discs 458 and 460 are identical. The wire and array spacing are selected to provide the appropriate impedance matching for the antenna 10 at the desired operating frequency.

The discs 458 and 460 are supported by mounting structure 462 and 464 wherein disc 458 is rotatably driven by a drive mechanism 468 and disc 460 is driven by a drive mechanism 470. Disc 458 and 460 are coaxial with antenna 10 and are mounted to rotate about the axis thereof.

The polarization of the beam produced by antenna 10 is controlled by the angular orientation of discs 458 and 460. By selectively positioning the discs, the beam can be caused to have linear, circular or eliptical polarization as desired.

Heretofore antenna systems have produced multiple beams by the use of selective polarization in which a given polarization corresponds to a particular beam shape. But the antenna system of the present invention provides a plurality of beam shapes, a search beam and a pencil beam, and either of these beam shapes can be produced with any of the various types of polarization mentioned above. The selection of both beam shape and polarization in a multiple beam system considerably enhances the applications and operability for a radar system.

The directional couplers described above are required to have extremely low numerically coupling values especially for the secondary feed couplers as shown by TABLE 1. It has heretofore been very difficult to design couplers having such low coupling parameters especially where the mechanical design and layout requirements are such that limited space is available and the coupled port must be at a right angle to the input feed line. A cross guide directional coupler which meets these requirements is now described in reference to FIGS. 10–14.

Figures 10, 11:
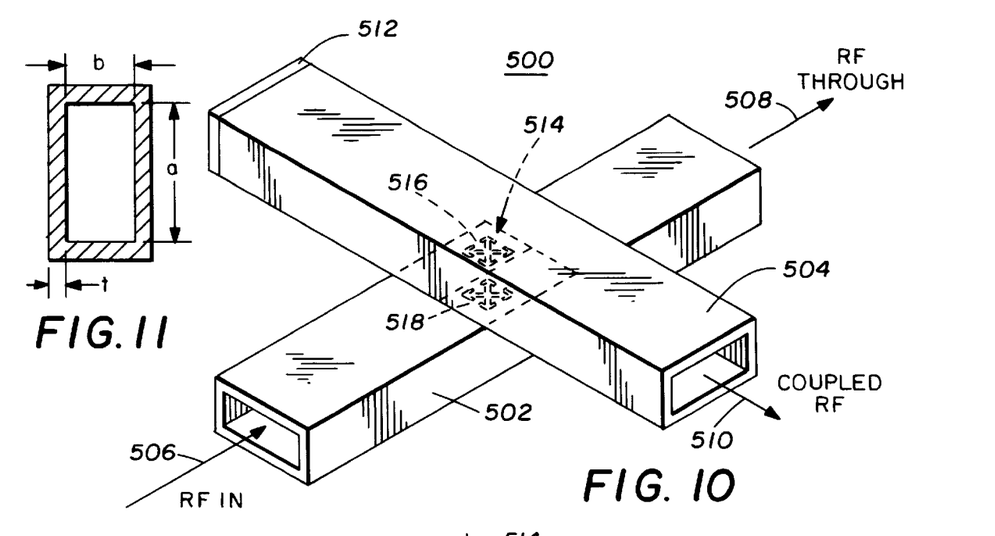
FIG. 10 is a perspective view of a cross guide coupler for use as a directional coupler in the present invention.
FIG. 11 is a waveguide cross section for use with the present invention.

Referring to FIG. 10 there is shown a cross guide coupler 500 which includes a main guide 502 and a secondary guide 504. RF energy is supplied to the coupler 500 as shown by arrow 506 with the noncoupled RF energy passing through the guide 502 as shown by arrow 508. The RF energy coupled in the desired direction through secondary guide 504 is shown by arrow 510.

The end of the secondary guide 504, opposite the direction of travel of the desired RF energy, is provided with a termination 512.

The guides 502 and 504 are connected through an aperture 514 which comprises identical patterns 516 and 518. RF energy which is supplied to the main guide 502 is coupled into the secondary guide 504 through aperture 514.

The dimensions of the guides 502 and 504 are shown in FIG. 11. The guide width is shown as "a", the height is shown as "b" and the wall thickness is shown as "t".

Figure 12:
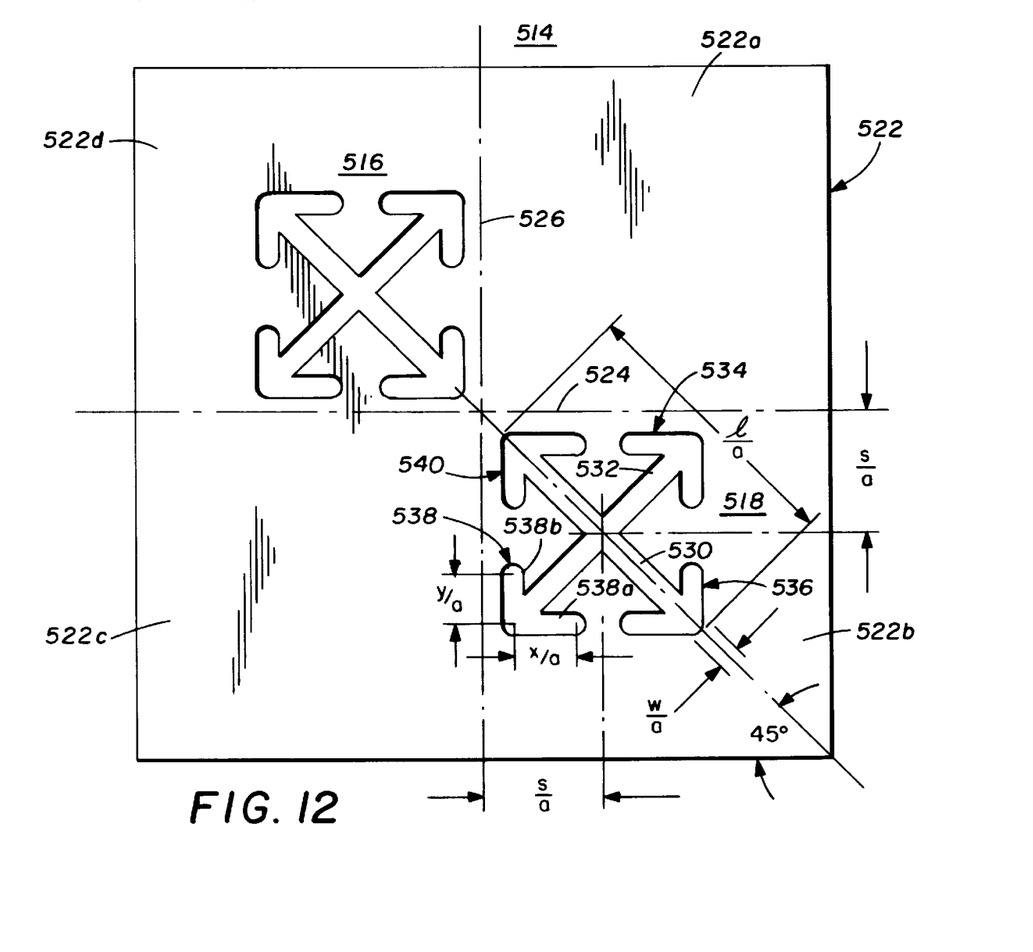
FIG. 12 is a plan view of the apertures shown in FIG. 10.

The aperture 514 is illustrated in FIG. 12. Patterns 516 and 518 are openings in a guide wall plane 522 which is the interface between the primary guide 502 and the secondary guide 504. Plane 522 is divided into quadrants 522 a–d by a horizontal center line 524 and a vertical center line 526. The pattern dimensions are normalized as a function of the guide width "a", where:

S/a is the perpendicular distance from the center of a pattern to each of the center lines 524 and 526, l/a is the greatest diagonal dimension of each pattern, w/a is the width of channels 530 and 532 of the patterns, x/a is the horizontal dimension, such as 538a, of the arrowhead-shaped portions 534–540 of the patterns, and y/a is the vertical dimension of the arrowhead-shaped portion, such as 538b, of the patterns. The ends of the arrowhead-shaped portions are curved beyond the defined dimensions.

Each pattern comprises two main channels 530 and 532 which are oriented at right angles with one channel having the axis thereof aligned along a diagonal of the square plane 522.

Figure 13:
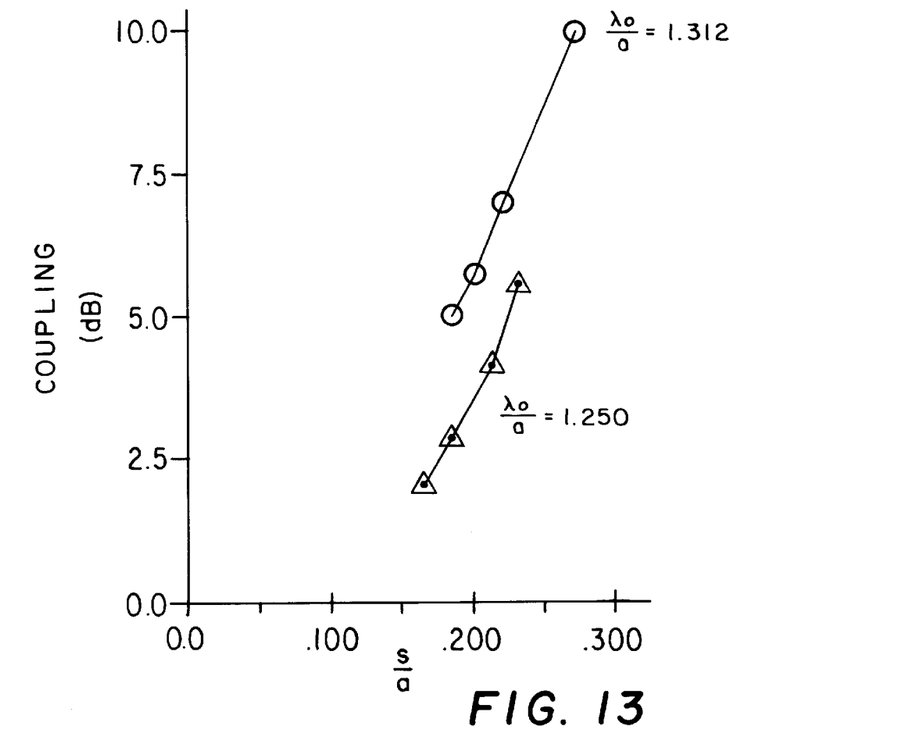
FIG. 13 is a graph of coupling as a function of aperture spacing for the apertures shown in FIG. 12.
Figure 14:
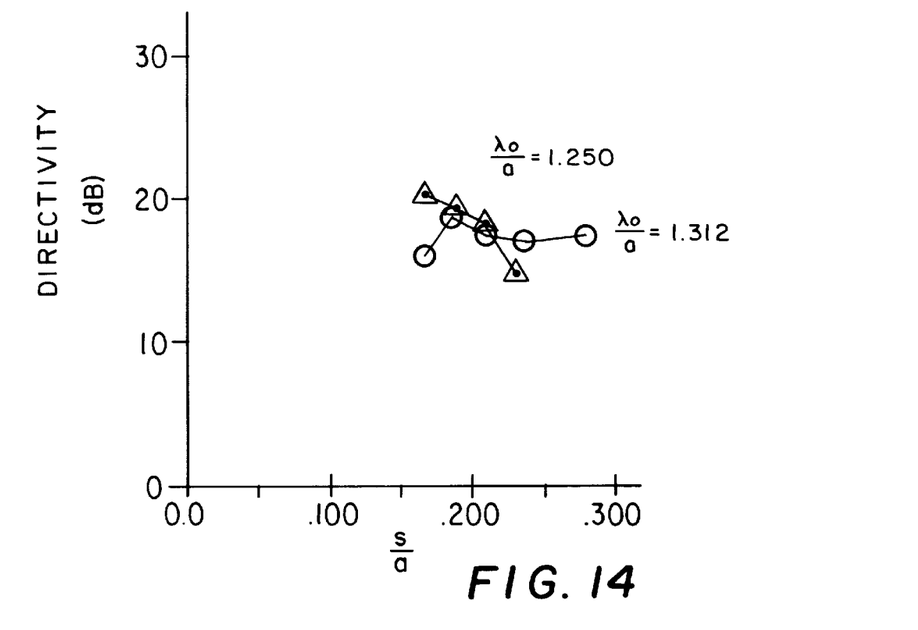
FIG. 14 is a graph of directivity as a function of aperture spacing for the apertures shown in FIG. 12.

An explanation of the implementation of the cross guide directional coupler 500 is now given in reference to FIGS. 13 and 14. The coupling parameter shown in FIG. 13 is a measure of the RF energy transferred from the main guide to the secondary guide. The directivity parameter shown in FIG. 14 is the difference in signal level between the coupled and isolated ports of the coupler and is a measure of the coupler's directionality.

The wavelength of the RF signal at the design frequency $F_o$ is given by $\lambda_o$. The design curves shown in FIG. 13 were empirically determined by holding the coupling aperture dimensions constant while varying the spacing between the two identical patterns 516 and 518. It is important to note that these curves apply only for the $\lambda_o/a$ ratios given (1.250 and 1.312). To design a coupler that gives the appropriate coupling and directivity at a given design frequency, it is necessary to calculate the guide width "a" that gives one of the two $\lambda_o/a$ ratios. Using the curves in FIGS. 13 and 14, the spacing "S" can be determined. The remainder of the aperture and guide dimensions, normalized to the guide width "a", are listed below in TABLE 2.

TABLE 2

| | | |
|---|---|---|
| b/a | = | .222 |
| t/a | = | .036 |
| l/a | = | .458 |
| w/a | = | .046 |
| x/a | = | .103 |
| y/a | = | .077 |

Coupling values of up to 2 db can be achieved using the design curves in FIGS. 13 and 14 and coupling values in the range of 3 db and less are especially useful in applications where mechanical and layout requirements are such that a coupled part must be at right angles to the input feed line.

In summary the present invention is a monopulse radar system which produces both pencil and shaped beams while operating in a monopulse receive mode for both beams. The antenna system can switch from one beam shape to the other in a period as short as ten microseconds. The beams produced thereby can further have any of a wide selection of polarizations by mechanically positioning polarization disc mounted ahead of the antenna.

Although several embodiments of the invention have been illustrated in the accompanying Drawings and described in the foregoing Detailed Description, it will be understood that the invention is not limited to the embodiments disclosed but is capable of numerous rearrangements, modifications and substitutions without departing from the scope of the invention.

We claim:

1. A dual beam monopulse antenna system comprising:
    an array of slotted waveguides arranged in a plurality of groups;
    a primary feed assembly for each group of said slotted waveguides, the primary feed assembly coupled to the slotted waveguides in the corresponding group;
    a secondary feed assembly for each group of said slotted waveguides, the secondary feed assembly coupled to both the slotted waveguides and the primary feed assembly for the corresponding group;
    a primary monopulse network connected to said primary feed assemblies and having a summation terminal, a first difference terminal and a second difference terminal;
    a secondary monopulse network connected to said secondary feed assemblies and having a summation terminal, a first difference terminal and a second difference terminal;
    means for coupling a system summation terminal to either the primary monopulse network summation terminal or to both the primary and the secondary monopulse network summation terminals;
    means for coupling a system first difference terminal to either the primary monopulse network first difference terminal or to both the primary and the secondary monopulse network first difference terminals; and
    means for coupling a system second difference terminal to either the primary monopulse network second difference terminal or to both the primary and the secondary monopulse network second difference terminals.

2. The antenna system recited in claim 1 wherein said primary feed assembly comprises a primary feed line, a plurality of directional couplers connected to said primary feed line and connecting lines joining the directional couplers to said slotted waveguides, and said secondary feed assembly comprises a secondary feed line, a plurality of directional couplers connected to both said secondary feed line and respectively to the directional couplers connected to said primary feed line.

3. The antenna system recited in claim 2 wherein said first monopulse network comprises:
    a first hybrid connected to two of said primary feed lines and having a first hybrid summation terminal and a first hybrid difference terminal;
    a second hybrid connected to the remaining two of said primary feed lines and having a second hybrid summation terminal and a second hybrid difference terminal;
    a third hybrid connected to the first and second hybrid difference terminals and having a third hybrid summation terminal which corresponds to said first monopulse network first difference terminal and a terminated third hybrid difference terminal; and
    a fourth hybrid connected to said first and second hybrid summation terminals and having a fourth hybrid difference terminal which corresponds to said first monopulse network second difference terminal and a fourth hybrid summation terminal corresponding to said first monopulse network summation terminal.

4. The antenna system recited in claim 2 wherein said second monopulse network comprises:

a first hybrid connected to two of said secondary feed lines and having a first hybrid summation terminal and a first hybrid difference terminal;

a second hybrid connected to the remaining two of said secondary feed lines and having a second hybrid summation terminal and a second hybrid difference terminal;

a third hybrid connected to the first and second hybrid difference terminals and having a third hybrid summation terminal which corresponds to said second monopulse network first difference terminal and a terminated third hybrid difference terminal; and a fourth hybrid connected to said first and second hybrid summation terminals and having a fourth hybrid difference terminal which corresponds to said second monopulse network second difference terminal and a fourth hybrid summation terminal which corresponds to said second monopulse network summation terminal.

5. The antenna system recited in claim 2 wherein the directional couplers connected to said primary feed line have respective coupling parameters to form a pencil-shape beam from the slotted waveguides.

6. The antenna system recited in claim 2 wherein the directional couplers connected to said primary and secondary feed lines have respective coupling parameters to form from said slotted waveguides a beam having a greater angular dimension in a selected plane than in a plane orthogonal thereto.

7. The antenna system recited in claim 1 wherein each of said means for coupling comprises a two state, four port circulator and a directional coupler, said circulator having a first port connected to one of the terminals of said first monopulse network, a second port connected to one of said system terminals, a third port connected to a first port of said directional coupler, and a fourth port connected to a second port of said directional coupler and a third port of said directional coupler connected to one of the terminals of said second monopulse network.

8. The antenna system recited in claim 1 including at least one polarization disc positioned offset from and parallel to said array for controlling the polarization of the beams produced by said antenna system.

9. The antenna system recited in claim 8 wherein said polarization disc comprises a central dielectric having a grid of parallel wires on each face thereof.

10. The antenna system recited in claim 8 including means for rotating said disc about the axis thereof for changing the polarization of the beams produced by said antenna system.

11. A dual beam monopulse antenna system, comprising:

an array of slotted waveguides arranged in a plurality of groups;

a primary feed assembly for each group of slotted waveguides, the primary feed assembly coupled to the slotted waveguides in the corresponding group;

a secondary feed assembly for each group of slotted waveguides, the secondary feed assembly coupled to both the slotted waveguides and the primary feed assembly for the corresponding group;

means connected to the primary and secondary feed assemblies for each group of slotted waveguides for coupling a group terminal to the primary feed assembly in a first state and to both the primary and the secondary feed assemblies in a second state; and a monopulse network connected to each of said group terminals and having a summation terminal, a first difference terminal and a second difference terminal.

12. The antenna system recited in claim 11 wherein said primary feed assembly comprises a primary feed line, a plurality of directional couplers connected to said primary feed line and connecting lines joining said directional coupler to said slotted waveguides, and said secondary feed assembly comprises a secondary feed line, a plurality of directional couplers connected to both said secondary feed line and respectively to the directional couplers connected to said primary feed line.

13. The antenna system recited in claim 12 wherein the directional couplers connected to said prmary feed line have respective coupling parameters to form a pencil-shape beam from the array of slotted waveguides.

14. The antenna system recited in claim 12 wherein the directional couplers connected to said primary and secondary feed lines have respective coupling parameters to form from said slotted waveguides a beam having a greater angular dimension in a selected plane than in a plane orthogonal thereto.

15. The antenna system recited in claim 11 wherein said monopulse network comprises:

a first hybrid connected to two of said group terminals and having a first hybrid summation terminal and a first hybrid difference terminal;

a second hybrid connected to the remaining two of said group terminals and having a second hybrid summation terminal and a second hybrid difference terminal;

a third hybrid connected to the first and second hybrid difference terminals and having a third hybrid difference terminal which corresponds to said monopulse network first difference terminal and a terminated difference terminal; and a fourth hybrid connected to the first and second hybrid summation terminals and having fourth hybrid difference terminal which corresponds to said monopulse network second difference terminal and a fourth hybrid summation terminal which corresponds to said monopulse network summation terminal.

16. The antenna system recited in claim 11 wherein said means for coupling comprises a two state, four port circulator and a directional coupler, said circulator having a first port connected to said primary feed assembly, a second port connected to the group terminal, a third port connected to a first port of said directional coupler and a fourth port connected to a second port of said directional coupler, and a third port of said directional coupler connected to said secondary feed assembly.

17. The antenna system recited in claim 11 including at least one polarization disc positioned offset from and parallel to said array for controlling the polarization of the beams produced by said antenna system.

18. The antenna system recited in claim 17 wherein said polarization disc comprises a central dielectric having a grid of parallel wires on each face thereof.

19. The antenna system recited in claim 17 including means for rotating said disc about the axis thereof for changing the polarization of the beams produced by said antenna system.

* * * * *